US008468277B1

(12) United States Patent
Thompson et al.

(10) Patent No.: US 8,468,277 B1
(45) Date of Patent: *Jun. 18, 2013

(54) INSTALLATION OF A DEVICE DRIVER

(75) Inventors: Kevin Thompson, Meridian, ID (US);
Eric Luttmann, Eagle, ID (US); David Watkins, Eagle, ID (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/601,611

(22) Filed: Aug. 31, 2012

Related U.S. Application Data

(63) Continuation of application No. 12/433,697, filed on Apr. 30, 2009, now Pat. No. 8,260,978.

(60) Provisional application No. 61/056,640, filed on May 28, 2008.

(51) Int. Cl.
*G06F 3/00* (2006.01)

(52) U.S. Cl.
USPC ........ 710/20; 710/8; 710/10; 710/11; 710/15; 710/62

(58) Field of Classification Search
USPC .................. 710/8, 10, 11, 15, 20, 62
See application file for complete search history.

(56) References Cited

U.S. PATENT DOCUMENTS

| | | | |
|---|---|---|---|
| 6,012,103 A | 1/2000 | Sartore et al. | |
| 6,236,462 B1 | 5/2001 | Terasaka | |
| 6,754,725 B1 | 6/2004 | Wright et al. | |
| 6,898,653 B2 | 5/2005 | Su et al. | |
| 7,237,101 B1 | 6/2007 | Dono et al. | |
| 2002/0073256 A1 | 6/2002 | Nakamura et al. | |
| 2003/0048473 A1 | 3/2003 | Rosen | |
| 2003/0184784 A1 | 10/2003 | Ferlitsch | |
| 2005/0162675 A1 | 7/2005 | Ferlitsch | |
| 2005/0182822 A1 | 8/2005 | Daniel et al. | |
| 2006/0031632 A1 | 2/2006 | Moran et al. | |
| 2007/0047524 A1 | 3/2007 | Moriya | |
| 2007/0053334 A1 | 3/2007 | Sueyoshi et al. | |
| 2007/0079065 A1 | 4/2007 | Bonella et al. | |
| 2007/0299650 A1 | 12/2007 | Tamayo et al. | |
| 2008/0055640 A1 | 3/2008 | Takahashi et al. | |
| 2008/0115071 A1 | 5/2008 | Fair | |
| 2008/0168188 A1 | 7/2008 | Yue et al. | |
| 2008/0195768 A1 | 8/2008 | Lowe et al. | |
| 2010/0023777 A1 | 1/2010 | Prevost et al. | |
| 2010/0146279 A1 | 6/2010 | Lu et al. | |
| 2010/0174834 A1 | 7/2010 | Lowe et al. | |
| 2011/0179204 A1 | 7/2011 | Hulbert et al. | |

OTHER PUBLICATIONS

U.S. Appl. No. 12/398,508, filed Mar. 5, 2009, Montierth et al., "Maintaining Firmware in a Network Connected Device".

(Continued)

*Primary Examiner* — Idriss N Alrobaye
*Assistant Examiner* — Jasjit Vidwan

(57) ABSTRACT

A service device that comprises a storage drive, where the storage drive includes an installer program, a device driver, and a mass storage interface. The mass storage interface is configured to enumerate the storage drive to a client device when the service device is coupled to the client device for a first time. The client device auto-launches the installer program in response to the service device being enumerated to the client device for the first time. The installer program installs the device driver in the client device in response to being auto-launched.

16 Claims, 3 Drawing Sheets

OTHER PUBLICATIONS

U.S. Appl. No. 12/501,270, filed Jul. 10, 2009, Luttmann et al., Detection of a USP OS Descriptor Request to Facilitate Installation of a Device Driver.

Devarapalli et al., "Mobile IPv6 Operation with IKEV2 and the Revised IPSec Architecture", IETF Trust 2007, Apr. 2007, pp. 1-24.

Johnson et al., "Mobility Support in IPV6", The Internet Society 2004, Jun. 2004, pp. 1-147.

Kaufman, "Internet Key Exchange (IKEv2) Protocol", The Internet Society, 2005, Dec. 2005, pp. 1-89.

Muhanna et al., "Binding Revocation for IPv6 Mobility draft-muhanna-mip6-revocation-02.txt", The IEFT Trust, 2007, Nov. 19, 2007, pp. 1-20.

Soliman, "Mobile IPv6 Support for dual stack Hosts and Routers (DSMIPv6) draft-ietf-mip6-nemo-v4traversal-06.txt", IETF, Nov. 2007, pp. 1-27.

US 8,468,277 B1

INSTALLATION OF A DEVICE DRIVER

CROSS REFERENCE TO RELATED APPLICATIONS

The present disclosure is a continuation of and claims priority to U.S. patent application Ser. No. 12/433,697, filed Apr. 30, 2009, entitled "INSTALLATION OF A DEVICE DRIVER," which is a nonprovisional of and claims priority to U.S. Patent Application No. 61/056,640, filed May 28, 2008, entitled "SEQUENCING OF THE PRINTER MANUFACTURER ID TO FACILITATE THE SEAMLESS USER EXPERIENCE ON EASY INSTALL," which is incorporated herein by reference.

TECHNICAL FIELD

Embodiments of the present invention relate to installation of a device driver, and more particularly, to installation of a device driver to a client device upon detection of the device by the client device.

BACKGROUND

A client device—for example, a desktop computer, a laptop, a server, and the like—may be operatively coupled to a service device. Types of service devices include a printer, a copier, a fax machine, a webcam, a television, a set-top box, a camera, or any other appropriate type of appliance or peripheral, that may provide one or more services to the client device. The service device may be operatively coupled to the client device through an appropriate link, e.g., a universal serial bus (USB) link, a wired or wireless network connection, a Bluetooth connection, a serial port connection, a parallel port connection, and the like.

In order to fully utilize the functionalities of a service device, an appropriate driver software (or device driver) typically needs to be loaded, installed, and configured in a client device, as is well known in the art. For example, if the service device is a printer, a printer driver of appropriate type may need to be installed and configured in the client device to enable the client device to access and print via the printer.

A client device can typically retrieve a device driver by accessing an appropriate external storage device, e.g., a CD ROM, a flash drive, etc. Alternatively, a client device may also access a device driver from an external server (e.g., a print server, if the service device is a printer), and/or over a network (e.g., using the Internet or an intranet, from a website of the manufacturer or seller of the service device, etc.).

While device drivers are often accessible to users of client devices through resources mentioned above, in some cases, however, a user of a client device may not have access to a device driver through such resources and/or may not be sure about which device driver to install on the client device. For example, many different device drivers for different types of client devices typically are available for installation on a given client device, and selection of an appropriate (or correct) device driver from among a plurality of device drivers may be a difficult task.

SUMMARY

In various embodiments, the present disclosure provides a service device that comprises a storage drive, where the storage drive includes an installer program, a device driver, and a mass storage interface. The mass storage interface is configured to enumerate the storage drive to a client device when the service device is coupled to the client device for a first time. The client device auto-launches the installer program in response to the service device being enumerated to the client device for the first time. The installer program installs the device driver in the client device in response to being auto-launched.

In various embodiments, the present disclosure provides a method that comprises coupling a client device to a service device; first enumerating, by the client device, the service device; detecting, by the client device, during said first enumerating, a presence of a storage drive in the service device, the storage drive including a device driver associated with the service device; and executing, by the client device, an autoplay program configured to launch an installer program in the service device thereby causing the installer program to install the device driver in the client device.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Figure 1:
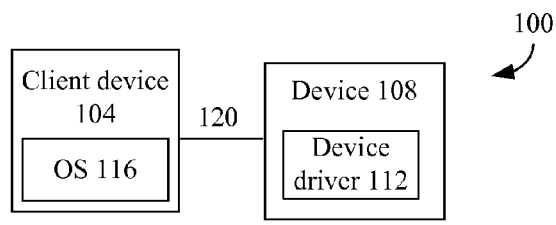
FIG. 1 schematically illustrates an exemplary system that includes a client device operatively coupled to a device through a link.

FIG. 1 schematically illustrates an exemplary system 100 that includes a client device 104 operatively coupled to a device 108 through a link 120. The client device 104 may be, for example, a desktop computer, a laptop, a server, and the like, and may operate with an appropriate type of operating system (OS) 116, e.g., Microsoft Windows®, Macintosh®, Linux®, etc. The device 108 may be, for example, a printer (e.g., a color printer, a monochrome printer, a multifunction printer that includes additional capabilities like scanning, faxing, copying, etc.), a fax machine, a copier, a scanner, a webcam, a camera, a television, or any other appropriate type of peripheral, appliance and/or a service providing device, and may have capability to communicate with the client device 104 and possibly provide one or more services to the client device 104. For example, if the device 108 is a printer, the client device 104 may utilize printing services offered by the printer to print image data. The link 120 may be of any appropriate type, including but not limited to a USB link, a wired or wireless network connection (e.g., a home or corporate network, an intranet, the Internet, a local area network (LAN), a wide area network (WAN), etc.), a Bluetooth connection, a serial port connection, a parallel port connection, and the like.

In one embodiment, the device 108 includes a device driver 112. A device driver (or software driver) is a computer program that permits higher-level computer programs to interact with a hardware device. A device driver generally acts as an abstraction layer between a hardware device and the applications or operating systems that use the hardware device. Each version of a device, such as a printer, typically requires its own hardware-specific specialized commands. In contrast, most applications utilize devices by means of high-level device-generic commands such as PRINTLN (print a line). The device-driver accepts these generic high-level commands and breaks the high-level commands into a series of low-level device-specific commands as required by the device being driven. The device driver 112 can be stored as firmware or embedded software in the device 108. For example, if the device 108 is a printer, the device driver 112 may be a print driver appropriate for the printer. Although not illustrated in FIG. 1, the device 108 may include a storage unit (e.g., a read only memory (ROM), a flash memory, or any other appropriate type of memory), and the device driver 112 may be stored in such storage unit.

A manufacturer or seller may upload the device driver 112 in the device 108 during manufacturing or selling of the device 108. In one embodiment, the device 108 may download the device driver 112, for example, from a website of a manufacturer (or from a server, e.g., a print server) over a network (not illustrated in FIG. 1). Other ways of providing the device driver 112 to the device 108 may also be envisioned by those skilled in the art (e.g., a system administrator or a user may upload the device driver 112, from an external storage device, to the device 108).

The device 108 may also include several components (not illustrated in FIG. 1) that are well known to those skilled in the art. For example, if the device 108 is a printer, then the printer may also include appropriate components required for printing, as is well known to those skilled in the art.

In order for the client device 104 to utilize the functionalities of the device 108, appropriate driver software of the device 108 may need to be loaded, installed, and configured in the client device 104. Subsequent to installation of the device driver 112, the client device 104 may effectively communicate with the device 108 and/or utilize one or more services offered by the device 108 (e.g., print a page if device 108 is a printer, download photos or videos if device 108 is a camera or a webcam, change a television channel if device 108 is a television, configure the device 108 from the client device 104, etc.).

Figure 2:
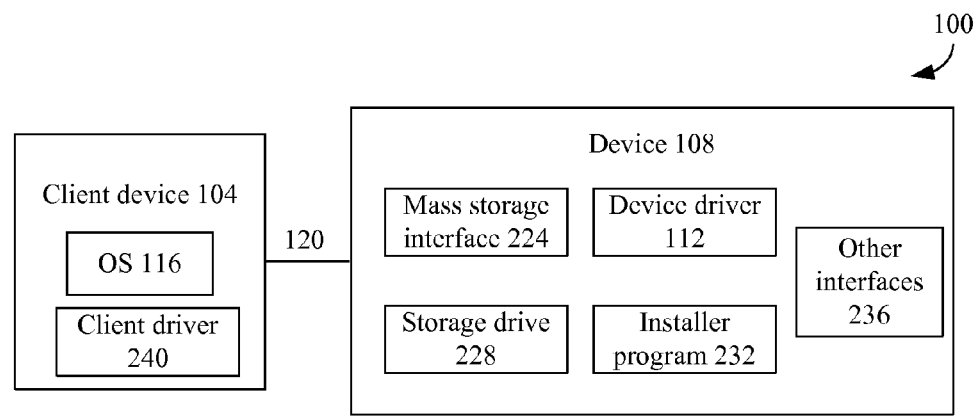
FIG. 2 schematically illustrates the exemplary system of FIG. 1 in more detail.

FIG. 2 schematically illustrates the exemplary system 100 of FIG. 1 in more detail. More specifically, FIG. 2 illustrates in more detail various components of the device 108. The device 108 includes the device driver 112, a mass storage interface 224, a storage drive 228, an installer program 232, and one or more other interfaces 236. Some or all the components illustrated in device 108 may be combined. For example, although the device driver 112 and the installer program 232 are illustrated as separate components, the installer program 232 may be a part of the device driver 112.

The storage drive 228 may be any type of suitable storage device or arrangement, either physical or virtual. In one embodiment, the storage drive 228 is a virtual storage drive. The virtual storage drive can be a virtual compact disc (CD) drive configured to emulate a real CD drive during an operation of the device 108. Thus, although the client device 104 may detect the presence of a virtual CD drive, the client device 104 may not be aware that the virtual CD drive is a "virtual" drive. That is, the client device 104 may assume the virtual CD drive to be a regular CD drive (as virtual CD drives may be configured to emulate a regular CD drive). Virtual CD drives are well known to those skilled in the art.

The installer program 232 may be stored in the storage drive 228. Alternatively, the storage drive 228 may include a pointer to the installer program 232. Thus, the installer program 232 may be stored in the storage drive 228 and/or in any other appropriate storage element (not illustrated in FIG. 2) in the device 108. In one embodiment, the installer program 232, when executed (e.g., by the OS 116), is configured to cause the device driver 112 to be installed in the client device 104, as discussed in greater detail below.

One or more other interfaces 236 is an interface to one or more other devices. For example, in various embodiments, if the device 108 is a printer, the interface 236 may be a print interface.

As is well known to those skilled in the art, an enumeration process involves discovering, by a host, a USB device and/or several properties of the USB device through exchange of signals between the host and the USB device once the host and the USB device are operatively coupled, and may also involve assignment of an address to the USB device and/or configuration of the USB device by the host.

In one embodiment, when the device 108 is coupled to the client device 104 for the first time, the device 108 reports the mass storage interface 224 to the client device 104. For example, if the device 108 is coupled to the client device 104 through a USB link 120, the device 108 reports the mass storage interface 224 to the client device 104 during an enumeration process of the device 108. Upon discovering the mass storage interface 224, (in one embodiment) the client device 104 views the device 108 as a mass storage device. During the enumeration process, the mass storage interface 224 may also enumerate the storage drive 228 to the device 108.

Put differently, when the device 108 is coupled to the client device 104 for the first time, the client device 104 (e.g., the OS 116) may view the device 108 as a mass storage device and/or may detect the presence of the mass storage interface 224 and/or the storage drive 228 in the device 108.

As previously discussed, the client device 104 may operate on an appropriate OS 116, e.g., Microsoft Windows® operating system. As is well known to those skilled in the art, if an operating system (e.g., Windows XP®, Windows Vista®, etc.) in a client device detects a storage drive in a device coupled to the client device over a USB link, the OS may launch an auto-play program that is configured to auto-launch the storage drive. Thus, in various embodiments, OS 116 of the client device 104 may detect the storage drive 228 in the device 108 whenever the device 108 is coupled to the client device 104 for the first time, and the OS 116 may execute an auto-play program that may be configured to auto-launch the storage drive 228. As is well known to those skilled in the art, such auto-play program and/or auto-launching of the storage drive 228 may cause a dialog box (e.g., an auto-play prompt) and/or other visual indication to appear in a display screen of the client device 104. Thus, with the auto-launch of the storage drive 228, the storage drive 228 may be operatively mounted in the client device 104.

As previously discussed, the storage drive 228 in the device 108 may include the installer program 232 (or a pointer to the installer program 232). In such an embodiment, once the client device 104 auto-launches the storage drive 228, the installer program 232 is executed (possibly after being loaded in the client device 104), which causes the device driver 112 to be installed in the client device 104 as client driver 240. Thus, the device 108 may install the client driver 240 in the client device 104, and the client device 104 may then utilize one or more service offered by the device 108.

After the client driver 240 has been installed in the client device 104, the device 108 may be operatively decoupled from the client device 104 (i.e., the link 120 may be disconnected from the device 108 and/or the client device 104) for any reason, and operatively coupled once again. Alternatively, the client device 104 and/or the device 108 may be switched off, and then switched back on once again. For the purpose of this disclosure and unless otherwise stated, in various embodiments, any such events occurring after the successful installation of the client driver 240 in the client device 104 may be referred to as re-coupling the client device 104 and the device 108. Put differently, in various embodiments, operatively re-coupling may refer to, for example, operatively disconnecting and re-connecting the device 108 to the client device 104 subsequent to the successful installation of the client driver 240. Alternatively, in various embodiments, operatively re-coupling may also refer to switching off and then on the client device 104 and/or the device 108 subsequent to the successful installation of the client driver 240.

Once the device 108 is re-coupled to the client device 104, the client device 104 may again enumerate the device 108, detect the storage drive 228, and launch the auto-play program once again. That is, the OS 116 may once again auto-launch the storage drive 228 and may try to execute the installer program 232. The installer program 232 may be configured to check whether the device driver 112 has already been installed in the client device 104 as client driver 240 and thereby prevent any re-installation of the device driver 112 in the client device 104. However, the auto-playing of the storage drive 228 each time the device 108 is re-coupled to the client device 104, may be confusing to a user of client device 104. For example, when the OS 116 executes the auto-play program upon detecting the storage drive 228 and auto-launches the storage drive 228, certain dialog box and/or other visual indication for the auto-play prompt and/or auto-launch may appear in the display screen of the client device 104. Appearance of such visual indication every time the client device 104 is re-coupled to the device 108 may be confusing to the user of the client device 104.

Accordingly, in various embodiments, it may be desirable to prevent the OS 116 from executing the auto-play program and the auto-launching of the storage drive 228 every time such re-coupling is performed and to prevent enumeration of the storage drive 228. An example of one way to achieve this may be to uninstall, disable and/or remove the storage drive 228 and/or the mass storage interface 224 from the device 108 upon successful installation of the device driver 112 in the client device 104. This may ensure that the OS 116 does not detect the storage drive 228 during a re-coupling, and hence, does not execute the auto-play program. Those skilled in the art will understand that there are other acceptable ways to prevent execution of the auto-play program and the auto-launching of the storage drive 228.

Figure 3:
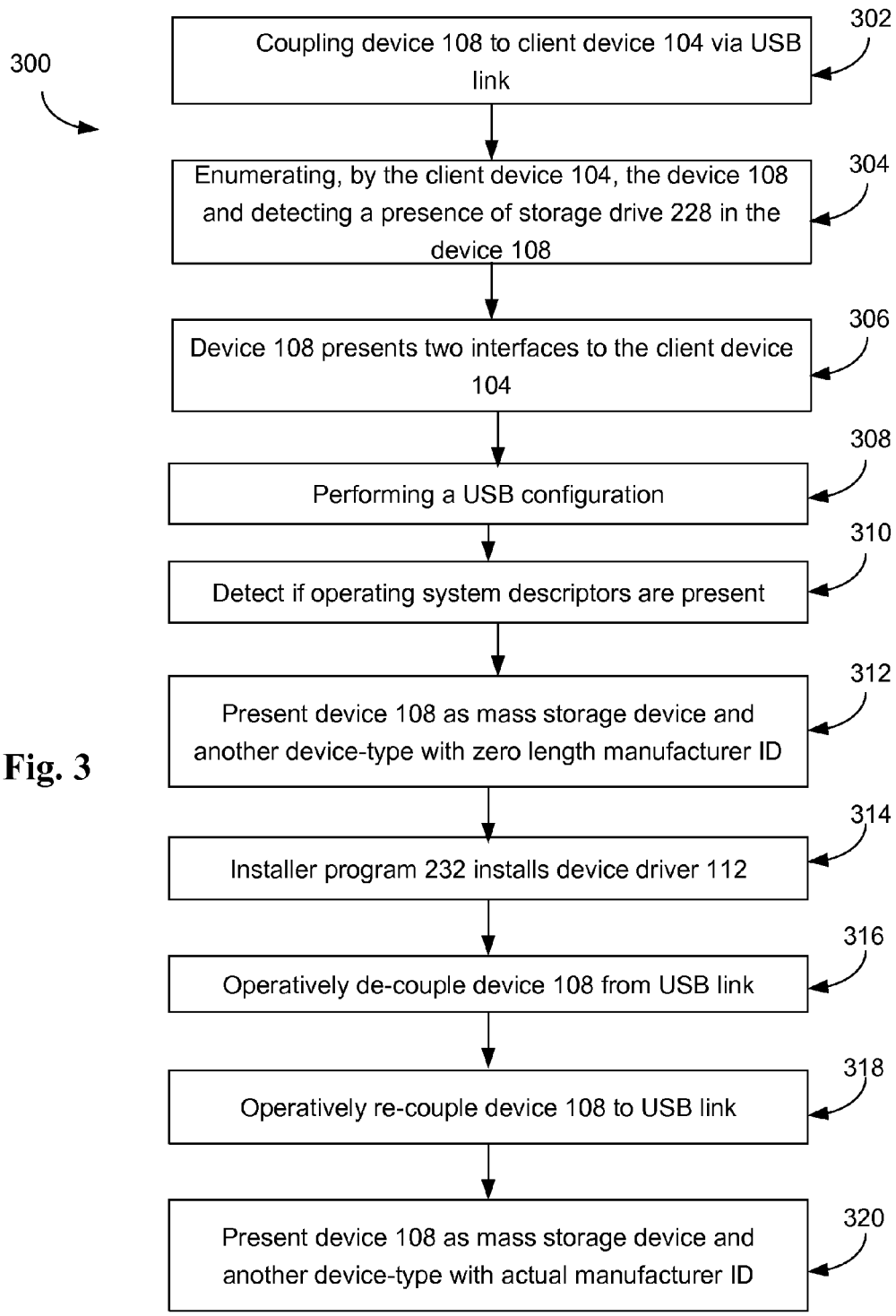
FIG. 3 illustrates an exemplary method for installing a device driver in a client device.

FIG. 3 illustrates a method 300 of installing a device driver 112. At 302 and 304, device 108 is coupled to client device 104 and the device 108 is enumerated by the client device 104, which includes detecting the presence of the storage drive 228 in the device 108. At 306, the device 108 presents two interfaces, a mass storage device interface 224 and a device interface 236, i.e., a printer interface.

In accordance with various embodiments, device 108 is coupled to the client device 104 using a universal serial bus (USB) link, and thus, the enumeration process more particularly includes performing a USB configuration process at 308 after coupling the device 108 to the client device 104. The device 108, via installer program 232, detects, at 310, if operating system descriptors for the client device 104 are present. If operating system descriptors for the client device 104 are present, the device 108 is presented to the client device 104 as a mass storage device and as another device-type, i.e., a printer, having zero-length manufacturer identification (ID), at 312. By providing a zero length manufacturer ID to the client device, the operating system of the client device registers the device 108 as a composite device (i.e., as both a mass storage device and, for example, a printing device) that keeps the client device 104 from trying to do an installation process of the device 108. At 314, the installer program 232 then installs the device driver 112 from storage drive 228, which then become the client drivers 240 on client device 104. Upon completion, the installer program 232 causes the device 108 to operatively de-couple the device 108 from the USB link at 316. The installer program 232 then causes the device 108 to operatively re-couple to the USB link and go through an enumeration process again at 318. Thus, the device 108 once again detects if operating system descriptors for the client device 104 are present upon operatively re-coupling the device to the USB bus. If the operation system descriptors for the client device 104 are present, which is generally the case, the device 108 is now presented to the client device 104 as a mass storage device and as another device-type, i.e., a printer, and the actual manufacturer identification for the device 108 is now provided to the operating system 216 at 320. The operating system 116 will now generally attempt to perform an installation process of the device 108 but will see that the drivers 240 are already present on client device 104 and thus, installation is complete such that the client device 104 may use the services of the device 108.

In accordance with various embodiments, if the operating system 116 of the client device 104 does not attempt to auto-install the device 108, then the installer program 232 may prompt the user of the client device to access the storage drive 228 to access the storage drive 228 and thus, manually install the device driver 112 as the client drivers 240.

Figure 4:
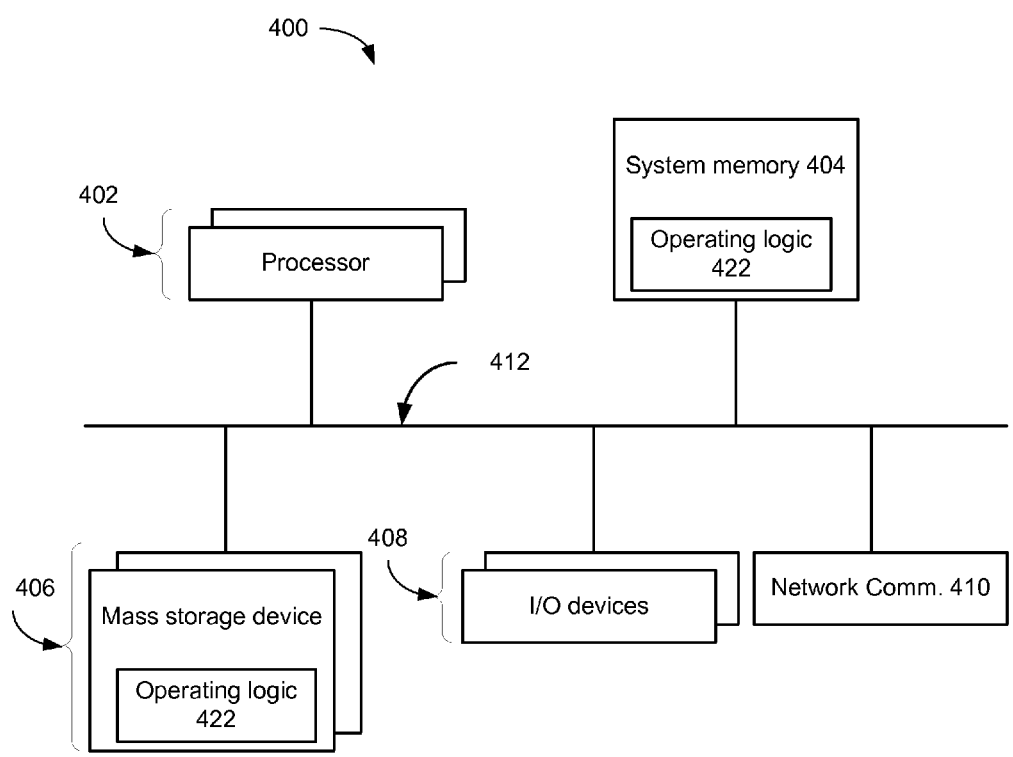
FIG. 4 is a block diagram of an exemplary system.

FIG. 4 is a block diagram of an exemplary system 400. As illustrated, system 400 includes one or more processors or processor cores 402, and system memory 404. For the purpose of this application, including the claims, the terms "processor" and "processor cores" may be considered synonymous, unless the context clearly requires otherwise.

Additionally, system 400 includes mass storage devices 406 (such as diskette, hard drive, compact disc read only memory (CDROM) and so forth), input/output devices 408 and communication interfaces 410 (such as network interface cards, modems and so forth). The elements of FIG. 4 are coupled to each other via system bus 412, which may represent one or more buses. In the case of multiple buses, they may be bridged by one or more bus bridges (not illustrated).

Each of these elements performs its conventional functions known in the art. In particular, system memory 404 and mass storage 406 may be employed to store a working copy and a permanent copy of the programming instructions implementing all or a portion of earlier described functions, herein collectively denoted as 422. The instructions 422 may be assembler instructions supported by processor(s) 402 or instructions that can be compiled from high level languages, such as C.

The permanent copy of the programming instructions may be placed into permanent storage 406 in the factory, or in the field, through, for example, a distribution medium (not shown), such as a compact disc (CD), or through communication interface 410 (from a distribution server (not shown)). That is, one or more distribution media having instructions 422 may be employed to distribute the instructions 422 and program various client devices. The constitution of these elements 402-412 are generally well known, and accordingly will not be further described.

In various embodiments, the system 400 may be configured to operate as the client device 104 of FIGS. 1 and 2. The system 400 may have a Microsoft Windows® operating system (e.g., Windows XP, Vista, etc.) installed. The system 400 may further be configured to be coupled to the device 108 through USB link 120. One or more instructions stored in the system memory 404 and/or storage device 406 may cause the system 400 to enumerate the device 108, detect the presence of the storage drive 228, and cause the device 108 to install the client driver 240 in the system 400. In various embodiments, one or more instructions associated with the client driver 240 may be stored in the system memory 404 and/or storage device 406.

In various embodiments, the system 400 may also be configured to operate as the device 108 of FIGS. 1 and 2, and may include several components, such as storage units (e.g., system memory 404 and/or storage device 406) to store one or more instructions associated with the device driver 112 and/or the installer program 232, the mass storage interface 224, storage drive 228, one or more other interfaces 236 (e.g., a print interface if device 108 is a printer), and one or more other components not illustrated in FIG. 1, 2 or 4 (e.g., a printing mechanism if the device 108 is a printer). The system 400 may be configured to be coupled to the client device 104 and provide one or more services to the client device 104. The system 400 may also be configured to install the client driver 240 in the client device 104 the first time the client device 104 is coupled to the device 108. One or more instructions (e.g., instructions 422) stored in the system memory 404 and/or storage device 406 may facilitate one or more operations of the system 400.

Although specific embodiments have been illustrated and described herein, it will be appreciated by those of ordinary skill in the art and others, that a wide variety of alternate and/or equivalent implementations may be substituted for the specific embodiment illustrated and described without departing from the scope of the present invention. This present invention covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware. This application is intended to cover any adaptations or variations of the embodiment discussed herein. Therefore, it is manifested and intended that the invention be limited only by the claims and the equivalents thereof.

What is claimed is:

1. An apparatus associated with a first device, the apparatus comprising:
a non-transitory storage medium comprising instructions for installing a device driver in a second device, wherein the instructions are tangibly stored in the non-transitory storage medium, and wherein the instructions are executable by the apparatus to, in response to the first device being coupled to the second device for a first time,
i) enumerate the first device to the second device, wherein enumerating the first device to the second device includes presenting, to the second device, the first device simultaneously as (i) a device having a zero length manufacturer identification, and (ii) a mass storage device,
ii) install the device driver in the second device,
wherein the presentation of the first device as (i) a device having a zero length manufacturer identification, and (ii) a mass storage device prevents the second device from performing an installation process on the first device.

2. The apparatus of claim 1, wherein the non-transitory storage medium further comprises instructions to prevent the second device from enumerating the first device to the second device whenever the first device is re-coupled to the second device subsequent to the first time.

3. The apparatus of claim 1, wherein the first device comprises a printing device.

4. The apparatus of claim 1, wherein the first device is coupled to the second device over a universal serial bus (USB) link.

5. The apparatus of claim 4, wherein the non-transitory storage medium further comprises instructions to, in response to the first device being coupled to the second device for the first time:
perform a USB configuration process after the first device is coupled to the second device over the USB link; and
detect if operating system descriptors for the second device are present,
wherein, in response to the operating system descriptors being present, the first device is presented, to the second device, simultaneously as (i) a device having a zero length manufacturer identification, and (ii) a mass storage device.

6. The apparatus of claim 5, wherein the instructions are further to:
after installation of the device driver, operatively de-couple the first device from a USB bus of the second device; and
operatively re-couple the first device to the USB bus.

7. The apparatus of claim 6, wherein the instructions are further to:
- detect if operating system descriptors for the second device are present upon operatively re-coupling the first device to the USB bus; and
- if operating system descriptors for the second device are present, enumerate the first device as (i) a device having a non-zero length manufacturer identification, and (ii) a mass storage device.

8. The apparatus of claim 6, wherein the instructions are further to prevent the second device from enumerating the first device whenever the first device is re-coupled to the second device subsequent to the first time.

9. The apparatus of claim 6, wherein the instructions are further to prevent, in response to the first device being re-coupled to the second device subsequent to the first time, an auto-play program from being executed by the second device.

10. The apparatus of claim 1, wherein the instructions are further to enumerate a storage drive in the first device to the second device as a virtual storage drive in the first device.

11. The apparatus of claim 1, wherein the zero length manufacturer identification comprises a manufacturer identification with a zero length string.

12. A method of loading a device driver from a first device to a second device, the method comprising:
- in response to coupling the first device to the second device for a first time, first enumerating the first device to the second device, wherein the first enumerating the first device to the second device includes presenting, to the second device, the first device simultaneously as (i) a device having a zero length manufacturer identification, and (ii) a mass storage device; and
- installing the device driver in the second device,
- wherein the presentation of the first device as (i) a device having a zero length manufacturer identification, and (ii) a mass storage device prevents the second device from performing an installation process on the first device.

13. The method of claim 12, further comprising:
- de-coupling the first device from the second device;
- re-coupling the first device to the second device;
- in response to re-coupling the first device to the second device, second enumerating the first device to the second device; and
- during the second enumerating, preventing detection of a storage drive in the first device, wherein the storage drive includes the device driver.

14. The method of claim 13, wherein the first device is coupled to the second device for the first time over a universal serial bus (USB) link, and the method further comprises:
- after the first device is coupled to the second device over the USB link, performing a USB configuration process; and
- detecting if operating system descriptors for the second device are present,
- wherein, in response to the operating system descriptors being present, the first device is simultaneously enumerated as (i) a device having a zero length manufacturer identification for the device, and (ii) a mass storage device.

15. The method of claim 14, further comprising:
- after installation of the device driver, operatively de-coupling the first device from a USB bus of the second device; and
- operatively re-coupling the first device to the USB bus of the second device.

16. The method claim 15, further comprising:
- detecting if operating system descriptors for the second device are present upon operatively re-coupling the first device to the USB bus; and
- if operating system descriptors for the second device are present, second enumerating the first device as (i) a device having a non-zero length manufacturer identification, and (ii) a mass storage device.

* * * * *